United States Patent [19]
Blue et al.

[11] 3,845,462
[45] Oct. 29, 1974

[54] SONAR SIGNAL PROCESSING AND DISPLAY TECHNIQUE

[75] Inventors: J. E. Blue, Orlando, Fla.; J. G. Pruitt, Austin, Tex.

[73] Assignee: The United States of America as represented by the Secretary of the Navy, Washington, D.C.

[22] Filed: July 24, 1972

[21] Appl. No.: 274,545

[52] U.S. Cl. ............... 340/3 R, 340/3 C, 343/5 CD
[51] Int. Cl. .............................................. G01s 7/62
[58] Field of Search .................. 340/3 C; 343/5 CD

[56] References Cited
UNITED STATES PATENTS
3,614,720  10/1971  Ludlum.......................... 340/3 C X

*Primary Examiner*—Richard A. Farley
*Attorney, Agent, or Firm*—R. S. Sciascia; R. J. Miller

[57] ABSTRACT

The object of this invention is to provide an improved system for presentation of information available at a sonar receiver by the use of parallel processing and simultaneous display of individual color signals on a color cathode ray tube.

3 Claims, 3 Drawing Figures

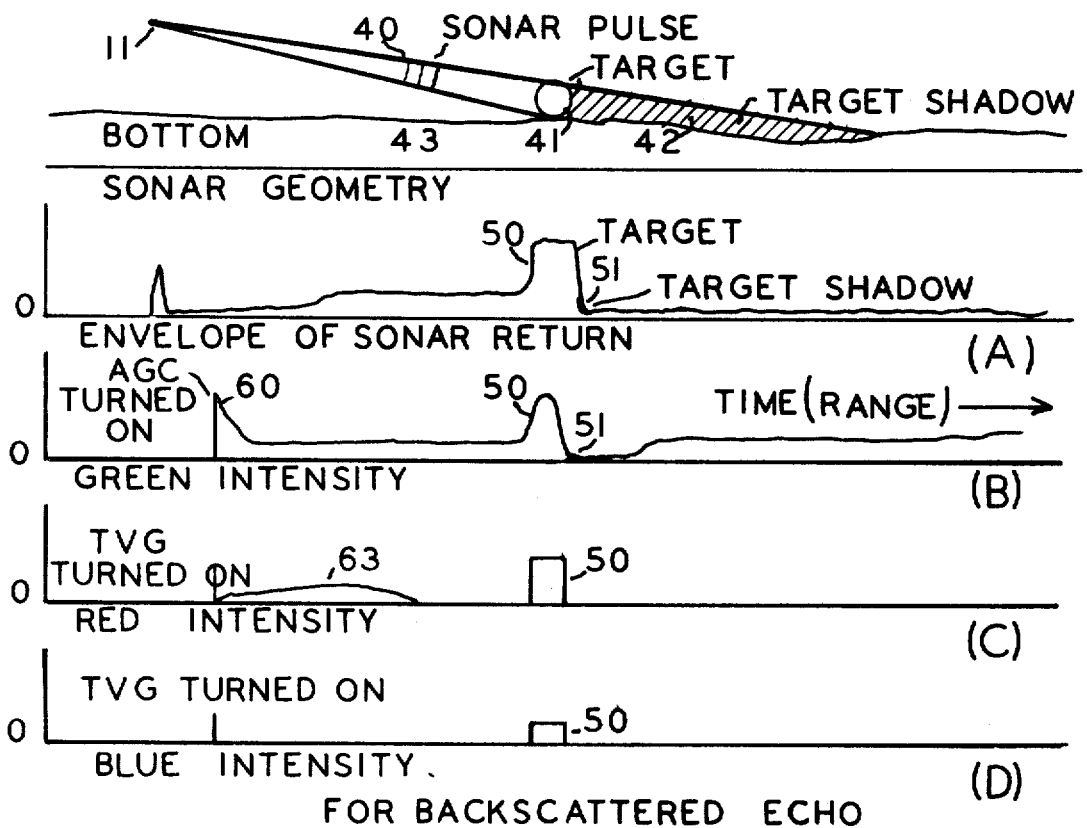
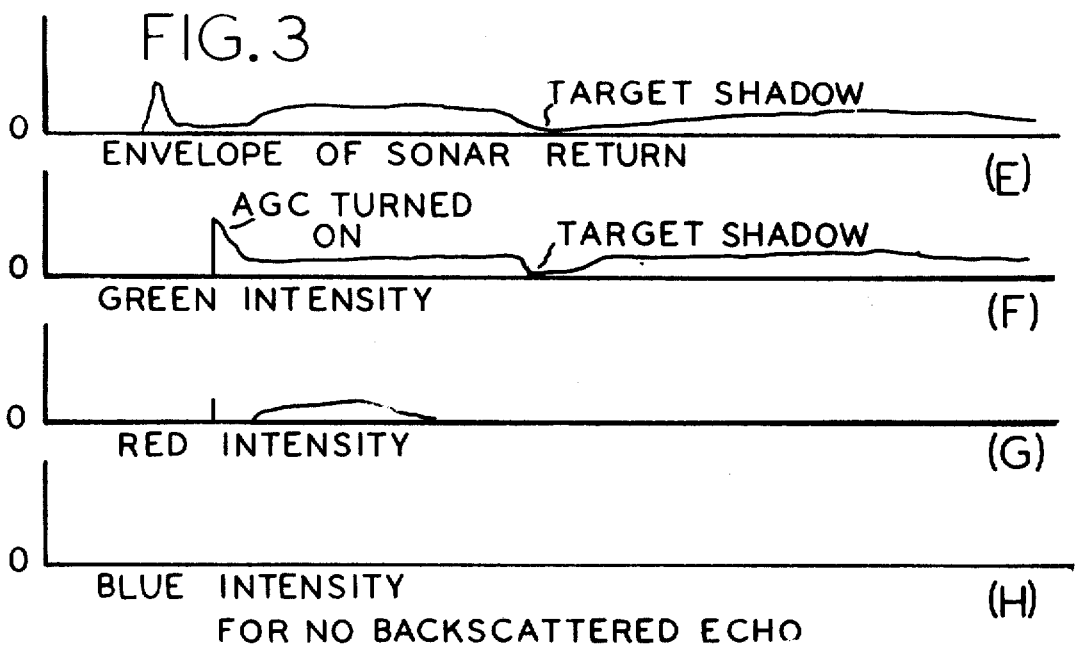

SONAR SIGNAL PROCESSING AND DISPLAY TECHNIQUE

"The invention described herein may be manufactured and used by or for the Government of the United States of America for governmental purposes without the payment of any royalties thereon or therefor."

One of the more common devices for displaying the information available to an active sonar receiver is the monochromatic cathode ray tube. The spatial parameters, range and bearing are presented map-like on the face of the cathode ray tube, while the signal strength is used to intensity modulate the light emitted by the cathode ray tube (CRT).

A time-varying gain (TVG) is usually applied to the modulation signal to compensate for the spreading and attenuation losses by signals returned from different ranges. To display targets and reverberation simultaneously at different ranges is difficult since the time varying gain required to accommodate for reverberation level as a function of range is different from the time varying gain required to accommodate for target strength as a function of range. The time varying gain function chosen may be a compromise between the two. In addition to the time varying gain, automatic gain control (AGC) is generally applied to sonars. Automatic gain control acts to "flatten" the reverberation signal at the expense of target strengths from the longer ranges.

It is therefore an object of this invention to provide an improved sonar signal display system utilizing a color display tube.

It is a further object of this invention to provide an improved sonar signal display system whereby strong echoes appear on the tube in a different color than the reverberation echoes.

And yet a further object of this invention is to provide an improved sonar signal display system wherein there is a higher probability of detection of a target in a sonar signal means.

Still a further object of this invention is to provide an improved sonar signal system wherein shadows do not appear behind side-lobe detected targets.

Still a further object of this invention is to provide an improved sonar signal display system wherein the cathode ray tube blooming can be eliminated.

And yet a further object of this invention is to provide an improved sonar signal system which will provide a three color display system for sonar system comprising; a sonar signal projector and receiver system including; a three gun color tube; first, second and third threshold circuits in said receiver individually controlling voltage applied to individual ones of color guns in a colored cathode ray tube in said receiver; an input circuit adapted to receive a signal sonar echo return; a first circuit coupled to the input circuit for feeding a signal thru an automatic gain control circuit; a delay circuit and a first amplifier circuit coupled to said first circuit and to said first threshold circuit; a second amplifier coupled to feed a signal to the second of said threshold circuits; and a third amplifier coupled to feed a signal to the third threshold circuit; the automatic gain control adjusted to produce a back scatter signal of one color while the second and third amplifiers are adjusted to produce target echo signals which have a combination of all three color guns.

And yet a further object of this invention is to provide a three color display system of the previous paragraph wherein there is additionally provided first and second time varying gain circuits to control the gain of the second and third amplifiers.

Other objects, advantages and novel features of the invention will become apparent from the following detailed description of the invention when considered in conjunction with the accompanying drawing wherein:

FIG. 2 shows a sonar projector and target.

FIG. 3 shows a series of voltage curves for the case of "target echo backscatter" and for "no target echo backscatter."

Figure 1:
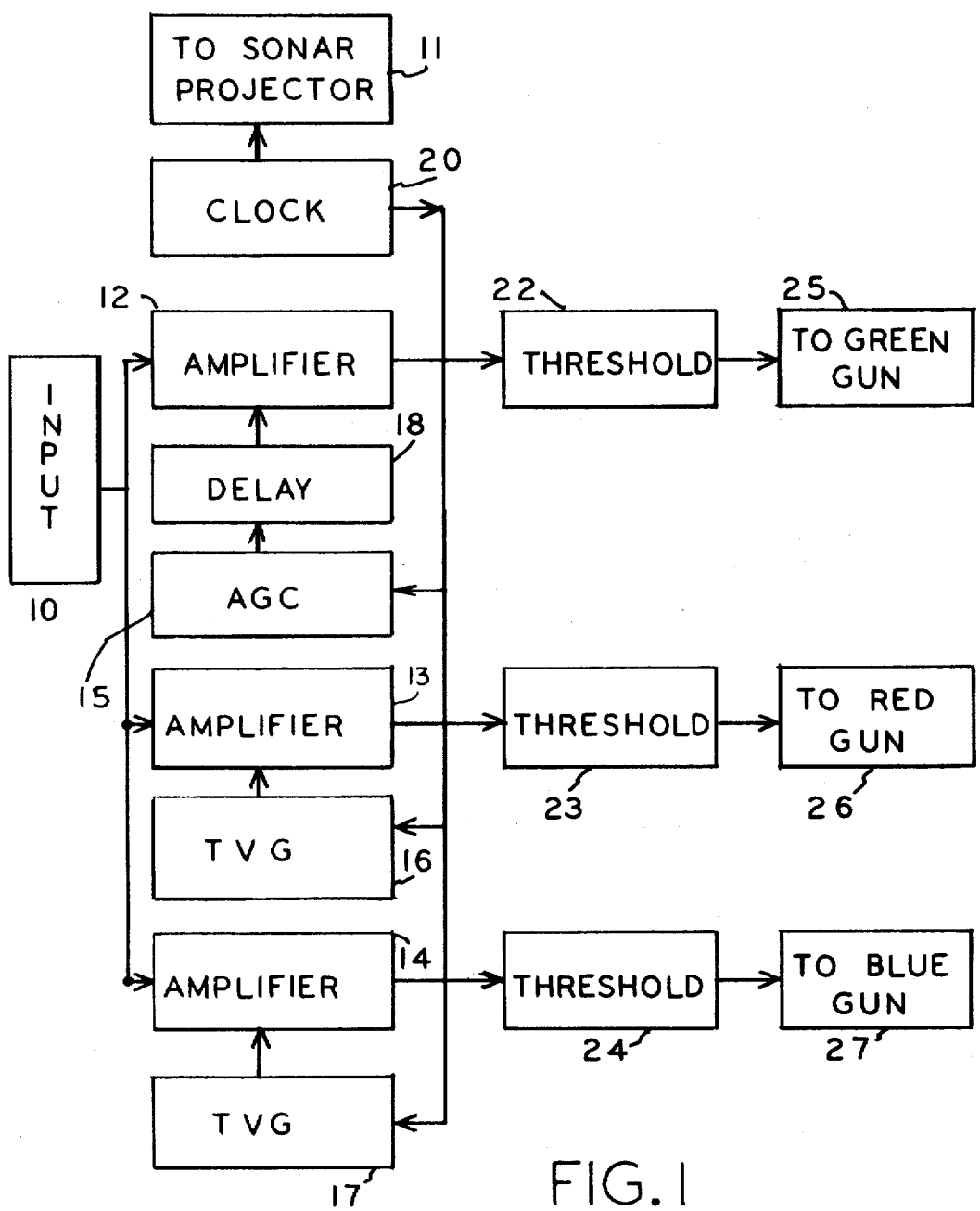
FIG. 1 is a block diagram showing the three color display system for simultaneously display of reverberation and target.

In FIG. 1, the box designated input 10 receives a sonar signal back after the sonar projector 11 has generated a signal which has gone out to a target and returned. This signal is the instantaneous wave form received from a single beam formed by the receiving hydrophone array. This input is divided and sent to first, second and third amplifiers 12, 13 and 14 and to an automatic gain control circuit 15. Amplifiers 13 and 14 have their gain controlled by first and second individual time varying gain circuits 16 and 17. The gain of amplifier 12 is controlled by a signal from the automatic gain control 15 which has been fed thru a delay circuit 18. A clock circuit 20 controls the output of the sonar projector 11 and the time varying gain controls 16 and 17 and also actuates the automatic gain control 15. The output of amplifier 12 is fed thru first threshold circuit 22 and that of amplifier 13 thru a second threshold circuit 23 and that of amplifier 14 thru a third threshold circuit 24. The individual threshold circuits 22, 23 and 24 are coupled to control individual color guns in a three gun cathode ray tube. Threshold 22 controls the green gun 25 threshold 23 controls the red gun 26 and threshold 24 controls the blue gun 27.

Referring now to FIG. 2 and 3 which shows how the signal processor of FIG. 1 operates on the sonar return for the case where the target area is approximately equal to or less than the area resolved by the sonar. The cases as shown are for strong target echo in the backscatter direction and for no target echo in the backscatter direction. It should be noted that strong returns resulting in two or more color guns being turned on will result in color mixing on the face of the cathode ray tube. Such mixing can be controlled.

FIG. 2 shows sonar projector 11 projecting a sonar pulse 40 which impinges upon a target 41 which produces a target shadow 42. The ocean bottom 43 is set forth in the top of FIG. 2. Curve (A) shows the envelope of the sonar return signal with the vertical axis intensity or voltage.

The target echo 50 is shown as a substantially square wave with a target shadow area 51 directly behind it in time. It should be noted that the horizontal axis is time running to the right. The signal received and fed thru input 10 is that as shown in curve (A).

Curve (B), the green intensity voltage display, shows a sonar pulse at the automatic gain control turn-on point 60 which includes the delay period from circuit 18 after the sonar pulse. Target signal 50 and target shadow 51 are shown. The automatic gain control 15 which turns on in conjunction with delay circuit 18 the gain as a time related function and tends to raise the curve to the right in a predetermined gain pattern.

The time varying gain circuits 16 and 17 turn on amplifiers 13 and 14 and with the setting of red intensity curve C and blue intensity curve D, the red and blue gun applied intensity is indicated. The red gun develops a signal 63 and the target signal 50 with the blue intensity different than that of the red intensity, the target 50 signal is similar and there is no other blue signal generated.

The net result would be to generate a target echo which is in one color with the combination of the red, green and blue guns 25, 26, 27 generating signals. The target shadow area would appear as a green signal. The combination of red and green signals form the signal displayed on the color tube representing reverberation echoes from areas in front of the target, the target and the target shadow area. Since the amplifier circuits 12, 13 and 14 are adjustable, the effect of the blue gun signal in conjunction with the red gun signal gives the operator a visual indication of target strength since the blue/red signal combination would vary with the setting of the amplifier circuit levels.

Curves (E), (F), (G) and (H) represent the signals as they would appear at the various guns with no target echo backscatter.

Obviously many modifications and variations of the present invention are possible in the light of the above teachings. It is therefore to be understood that within the scope of the appended claims the invention may be practiced otherwise than as specifically described.

I claim:

1. A three color display system for sonar systems, comprising:
   a. a sonar signal projector and receiver system including first, second, and third guns in a three gun color tube;
   b. first, second, and third threshold circuits in said receiver individually controlling voltage applied to said first, second and third guns in said colored tube;
   c. an input circuit adapted to receive a sonar signal echo return;
   d. first, second, and third amplifier circuits coupled to receive a signal from said input circuit and to said first, second, and third threshold circuits respectively, to provide an amplified signal from said input to said threshold circuits;
   e. a clock circuit in said sonar signal projector;
   f. an automatic gain control circuit, and a time delay circuit coupled to receive a signal from said clock circuit and coupled to said first amplifier circuit for controlling the output of said first amplifier;
   g. a first time varying gain circuit coupled to said clock circuit and to said second amplifier, a second time varying gain circuit coupled to said clock circuit and to said third amplifier, said clock circuit generating signals to actuate said automatic gain control circuit and said first and second time variable gain circuits, said first amplifier circuit generating a signal thru said first threshold circuit to produce a display on the face of said tube from said first color gun including a target, a target shadow area and a background scatter signal, said second and third amplifiers generating signals to produce selected target signals and background scatter signals from said second and third guns.

2. The improved display system of claim 1 wherein said first, second and third amplifier circuits are individually adjusted to produce different levels of signals from said second and said third guns.

3. The improved display system of claim 2 wherein said block circuit is actuated by said signal projector to trigger said automatic gain control circuit and said first and second time varying gain circuits to produce predetermined delay in actuation of said first threshold circuit.

* * * * *